E. M. WINFREY.
COASTER BRAKE.
APPLICATION FILED OCT. 7, 1912.

1,066,353.

Patented July 1, 1913.

2 SHEETS—SHEET 1.

Witnesses
L. B. James
C. E. Hunt

Inventor
E. M. Winfrey
By H. B. Willson & Co
Attorneys

E. M. WINFREY.
COASTER BRAKE.
APPLICATION FILED OCT. 7, 1912.
1,066,353.
Patented July 1, 1913.
2 SHEETS—SHEET 2.
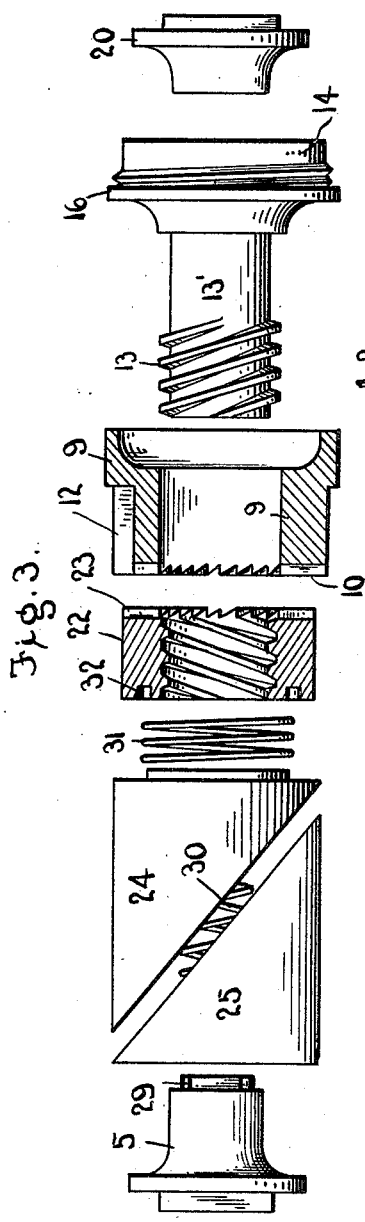
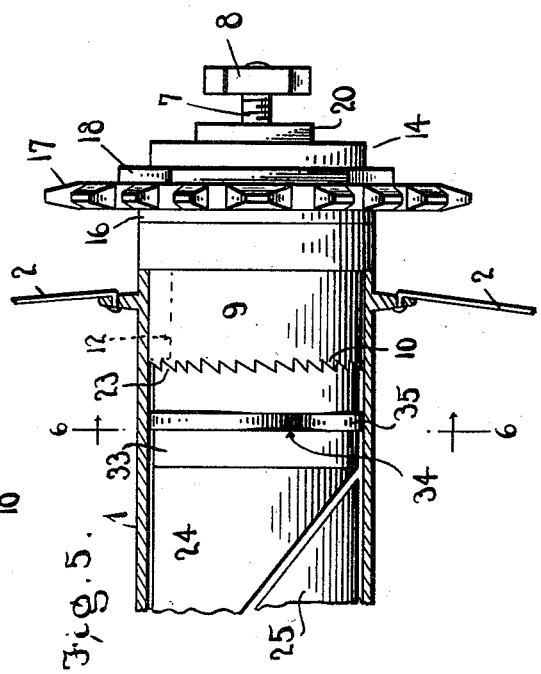
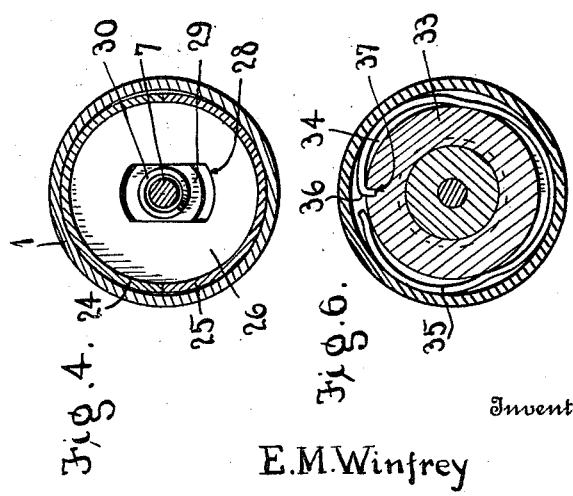
Witnesses
L. B. James
C. E. Hunt
Inventor
E. M. Winfrey
By H. B. Willson &co
Attorneys

UNITED STATES PATENT OFFICE.

EDGAR M. WINFREY, OF WICHITA FALLS, TEXAS.

COASTER-BRAKE.

1,066,353.  Specification of Letters Patent.  Patented July 1, 1913.

Application filed October 7, 1912. Serial No. 724,462.

*To all whom it may concern:*

Be it known that I, EDGAR M. WINFREY, a citizen of the United States, residing at Wichita Falls, in the county of Wichita and State of Texas, have invented certain new and useful Improvements in Coaster-Brakes; and I do declare the following to be a full, clear, and exact description of the invention, such as will enable others skilled in the art to which it appertains to make and use the same.

This invention relates to improvements in coaster brakes.

One object of the invention is to provide a coaster brake having an improved construction and arrangement of parts whereby a positive drive is obtained and whereby a braking action is obtained by a frictional engagement of the parts.

Another object is to provide a coaster brake which will be simple, strong, durable and inexpensive in construction, efficient and reliable in operation, and which is provided with a maximum amount of friction or braking surface.

With these and other objects in view, the invention consists of certain novel features of construction, combination and arrangement of parts as will be more fully described and claimed.

Figure 1:
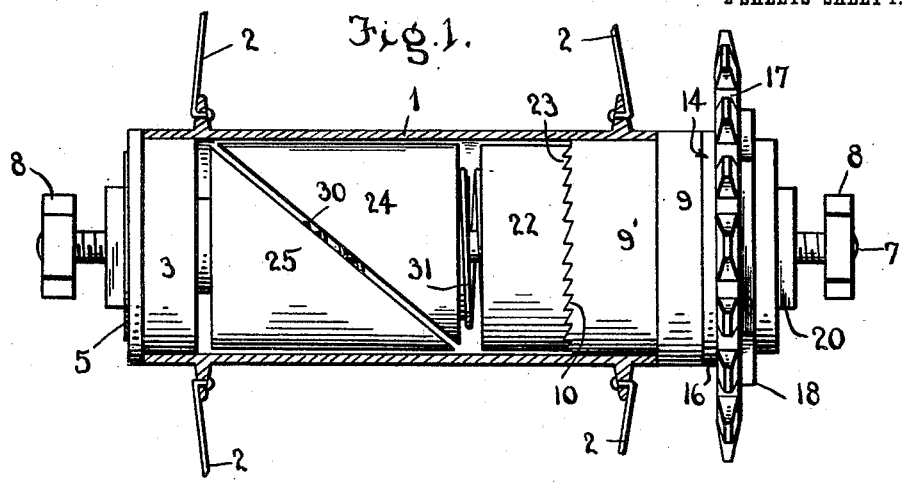
Figure 2:
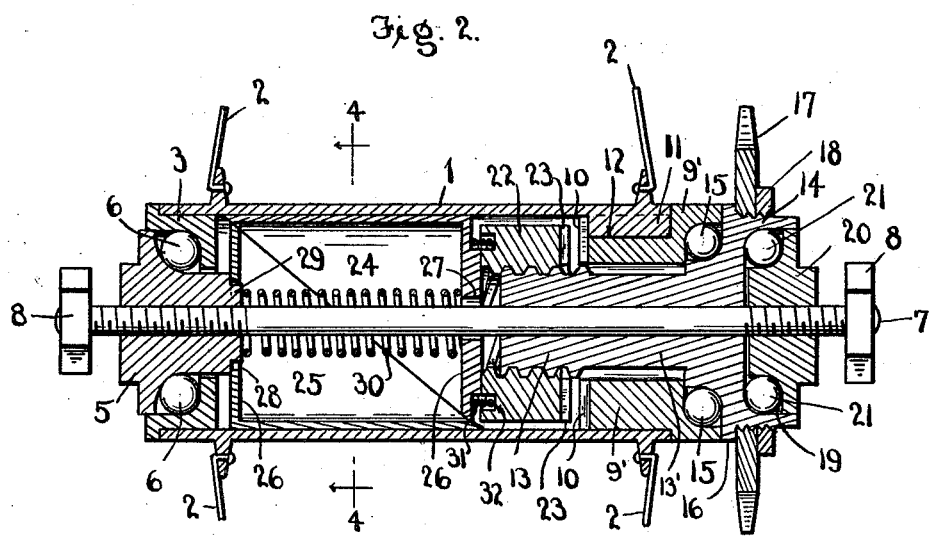
Figure 7:
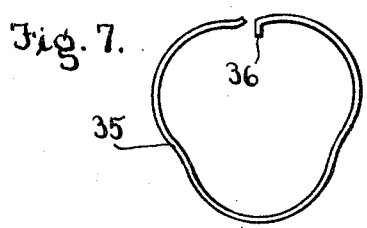
Figure 8:
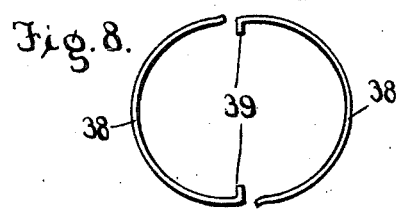

In the accompanying drawings, Figure 1 is a central vertical longitudinal section of the hub to which my improved brake is applied showing the operating mechanism in side elevation and in position for obtaining a positive forward drive; Fig. 2 is a central vertical section of the entire hub and braking mechanism showing the parts in reverse position and in frictional engagement for braking; Fig. 3 is a side view of the operating mechanism separated and parts of the same in section; Fig. 4 is a cross sectional view taken on the line 4—4 of Fig. 2; Fig. 5 is a detail longitudinal sectional view of a portion of the hub and a side view of the clutch member and adjacent parts of the brake showing a modified construction and arrangement of the friction spring for the drive clutch; Fig. 6 is a cross sectional view taken on the line 6—6 of Fig. 5; Fig. 7 is a detail view of the friction spring shown in Figs. 5 and 6; Fig. 8 is a similar view of the modified form of the spring shown in Fig. 7.

In the drawings the numeral 1 designates a tubular hub to which the spokes 2 are attached, 3 is a cup in its left end, 6 are balls therein, and 5 is a cone screwed onto the axle 7, the latter being held in the fork (not shown) by a nut 8 as usual. The cup 9 in the other end of the hub is carried inward in a rather long sleeve 9' notched at one side as at 12 to engage a lug 11 in the hub so as to cause these parts to rotate with each other. The driving sprocket 17 is by preference screwed onto the head 16 of the driver element which has its shank 13' projected inward within the sleeve 9', a nut 18 holding the sprocket 17 in place.

The numeral 20 designates the right hand cone, 21 are the balls between it and the cup or race 19 formed in the outer end of the head 16, and 15 are balls between the inner side of said head and the cup 9.

No novelty is claimed for the parts thus far described.

Formed on the inner end of the shank 13' is an external worm 13 which engages a clutch member 22 having ratchet teeth on its right end as shown at 23; while the inner end of the sleeve 9' has ratchet teeth 10 adapted to engage with them when the clutch member is drawn toward the sleeve. This action results from the interengagement of the worm 13 with the internal threads in the member 22, and the forward impulse imparted to the driver element by the rider when he turns the sprocket 17 forward.

In the outer end of the ball cup 18 is an annular ball race 19 into which is inserted an adjusting cone 20. Between the ball receiving surface of the cone 20 and the ball race 19 in the cup 14 is an annular series of bearing balls 21 which provide an antifrictional connection between the bearing cup 14 and the right hand bearing cone 20 of the hub. The cone 20 has a threaded engagement with the shaft 7 and is held by a locking nut 8 like that hereinbefore described.

Operatively engaged with the inner portion of the driving worm 13 is a clutch member 22 in the form of a ring having on its inner surface worm threads to engage the threads of the worm 13, whereby when the worm is turned in one direction or the other the clutch member will be shifted or run back and forth in the hub and on the inner end of the inner portion of the worm.

On the end of the clutch member 22 adjacent to the inner end of the ball cup 9 is an annular series of ratchet teeth 23 which when the clutch member is shifted by the worm toward the ball cup will be operatively engaged with the teeth 10 of the ball cup 9 thereby locking these parts together and locking the worm 13 and outer ball cup 14 and the sprocket gear 17 to the ball cup 9. The clutch member 22 is actuated to bring the same into engagement with the inner ball cup 9 and to thereby lock the parts together in the manner described, by a forward movement of the sprocket gear and as the right hand ball cup 9 is fixedly connected to the hub 1 by the engagement of the lug 11 on the hub with the notch 12 in the ball cup, the hub will also be locked to the operating mechanism and will be positively driven in a forward direction through the engagement of the clutch member 22 with the ball cup 9 as hereinbefore described.

In the hub 1 between the clutch member 22 on the inner portion of the worm 13 and the left hand cone of the hub are frictional brake shoes 24 and 25. The shoes 24 and 25 are in the form of hollow substantially semi-cylindrical bodies having closed outer ends or heads 26 and having their cylindrical outer surfaces corresponding with and of slightly less diameter than the inner diameter of the hub 1. The inner ends of the shoes 24 are oblique or cut off bias on a line from one end or head to the other end or head of the shoes, whereby when the shoes are brought together or one shoe forced inwardly upon the other said shoes will be expanded laterally to bring the curved or cylindrical surfaces thereof into frictional engagement with the inner surface of the hub thereby exerting a braking or retarding action to the latter and to the wheel connected therewith.

In the head or end 26 of the shoe 24 is an opening 27 through which the axle 7 passes. In the end or head 26 of the shoe 25 is an elongated aperture 29 with which is engaged a boss 29 formed on the inner end of the left hand cone 5 said boss having two of its opposite sides flattened whereby when the boss is engaged with the elongated aperture 28 in the shoe 25 the latter will be locked or held against rotation on the cone 5. The aperture 28 is of somewhat greater length than the longest diameter of the boss to permit the shoe 25 to expand or contract or to shift inwardly and outwardly in the hub. The angular opposing surfaces of the shoes 24 and 25 are normally held out of engagement and the shoes thus permitted to retract by the coil spring 30 which is arranged on the axle 7 within the shoes and has one end engaged with the boss 29 and the other end engaged with the inner side of the head 26 of the shoe 24.

When it is desired to apply a braking action to the hub a back motion is applied to the pedals to turn the sprocket gear 17 back or in a reverse direction thereby causing the worm member to screw the clutch member 22 inwardly thereby disconnecting said member from the sleeve 9' and engaging the clutch member with the head 26 of the brake shoe 24 which latter will be thus forced into engagement with the angular surface of the shoe 25 thereby forcing said shoes outwardly in opposite directions and bringing the outer curved or cylindrical surfaces thereof into frictional engagement with the inner surface of the hub thus applying a braking action to the hub as will be readily understood.

In order to hold the clutch member 22 against rotation with the worm, I provide a clutch holding spring 31 which in the main figures of the drawings is shown as a spiral spring which is arranged between the inner end of the brake shoe 24 and the adjacent end of the clutch member 22, said end of the clutch member having preferably formed therein an annular groove 32 to receive the end of the spring as shown. When thus arranged the pressure of the spring is applied to the clutch member to yieldingly hold the threads of the same in frictional engagement with the threads of the worm with sufficient pressure to prevent the clutch from turning with the worm and to permit the worm threads to turn in the threads of the clutch and thereby shift the latter in the manner described.

In Figs. 5, 6, 7 and 8 of the drawings is shown a clutch member of slightly modified form. In this instance the clutch member 33 is provided intermediate its ends with an annular groove 34 in which is arranged a flat spring 35 which extends around the clutch member in the groove 34 and is bent into a series of convolutions, the inwardly curved portions of which engage the bottom of the groove 34 while the outwardly curved portions thereof project beyond the outer side of the clutch member and engage the inner surface of the hub 1 as shown. One end of the spring 35 is bent inwardly to form a fastening lug 36 which is engaged with a notch or recess 37 in the bottom of the groove 34 of the clutch member and thereby locks the spring to the clutch member.

In Fig. 8 of the drawings is shown a modified form of clutch holding spring 38, adapted to be engaged with the groove 34 in the clutch member. Said spring 38, however, is formed in two substantially semi-circular sections, one end of each of which is bent inwardly to form a fastening lug 39 adapted to be engaged with a notch in the bottom of the groove in the clutch member, whereby said spring sections are fastened in position in the groove. The opposite ends of the sections of the spring are bent inwardly and engage the bottom of the groove 34 while the major part of the spring sections project beyond the sides of the clutch member to a slight extent and engage the inner surface of the hub. In both the modified forms of the clutch holding springs the frictional engagement of the same with the inner surface of the hub will yieldingly hold the clutch member sufficiently tight to prevent the same from turning with the worm 13 and will cause the threads of the worm to operatively engage the threads in the clutch member and thereby shift the latter into and out of engagement with the stationary clutch member of the hub as will be readily understood.

Having thus described my invention, what I claim is:

1. In a coaster brake, the combination with a tubular hub, ball cups within its ends, one of them having an inwardly projecting sleeve provided with ratchet teeth on its inner extremity, the driver having a shank projecting through the sleeve and provided with a worm, and balls and cones for the cups; of a clutch member internally threaded to engage the worm and having ratchet teeth in one end and an annular groove in the other, two brake shoes within the hub between said clutch member and the opposite cone, said shoes having obliquely cut contacting faces and closed heads whereof that of the outermost contacts with said cone, and a spring within said groove in the clutch member bearing against the adjacent shoe for yieldingly holding it against rotation.

2. In a coaster brake, the combination with a tubular hub having an internal lug at one end, ball cups within its ends, one of them having an inwardly projecting sleeve provided with a notch engaging said lug and ratchet teeth on its inner extremity, the driver having a shank projecting through the sleeve and provided with a worm, and bearings for the ball cups; of a clutch member internally threaded to engage the worm and having ratchet teeth to engage those on the sleeve and an annular groove in its body, two brake shoes within said hub whereof each has a cylindrical body, a closed outer end, and its inner end cut off oblique so as to contact with the inner end of the other shoe, the outer end of the outermost shoe having an elongated aperture through its center, a boss on the bearing at this end of the hub engaging said aperture, an expansive spring between said boss and the outer end of the other shoe, and a spring around said clutch member in the groove thereof having convolutions whereof some stand in contact with the bottom of the groove and others with the inner wall of said hub.

In testimony whereof I have hereunto set my hand in presence of two subscribing witnesses.

EDGAR M. WINFREY.

Witnesses:
G. B. NUCKOLLS,
E. A. YOUNG.

---

Copies of this patent may be obtained for five cents each, by addressing the "Commissioner of Patents, Washington, D. C."